United States Patent [19]
Kahle et al.

[11] Patent Number: 5,764,969
[45] Date of Patent: Jun. 9, 1998

[54] METHOD AND SYSTEM FOR ENHANCED MANAGEMENT OPERATION UTILIZING INTERMIXED USER LEVEL AND SUPERVISORY LEVEL INSTRUCTIONS WITH PARTIAL CONCEPT SYNCHRONIZATION

[75] Inventors: James Allan Kahle, Austin; Albert J. Loper, Cedar Park; Soummya Mallick, Austin; Aubrey Deene Ogden, Round Rock, all of Tex.; John Victor Sell, Los Altos, Calif.

[73] Assignee: International Business Machines Corporation, Armonk, N.Y.

[21] Appl. No.: 387,149

[22] Filed: Feb. 10, 1995

[51] Int. Cl.$^6$ ......................................................... G06F 9/44
[52] U.S. Cl. ........................... 395/569; 395/568; 395/570; 395/500
[58] Field of Search ........................... 395/182.13, 375, 395/490, 800, 700, 726, 569, 570, 735, 568, 500; 364/138

[56] References Cited

U.S. PATENT DOCUMENTS

| | | | |
|---|---|---|---|
| 3,828,327 | 8/1974 | Berglund et al. | 395/737 |
| 4,500,952 | 2/1985 | Heller et al. | 711/206 |
| 4,787,031 | 11/1988 | Karger et al. | 395/800 |
| 4,809,160 | 2/1989 | Mahon et al. | 395/186 |
| 5,063,499 | 11/1991 | Garber | 395/500 |

FOREIGN PATENT DOCUMENTS

| | | |
|---|---|---|
| 0 327 839 A2 | 1/1989 | European Pat. Off. |
| 0 602 773 A1 | 8/1993 | European Pat. Off. |

OTHER PUBLICATIONS

IBM Technical Disclosure Bulletin, vol. 16, No. 1, Jun. 1973, "Performance Evaluator for Operating System".

IBM Technical Disclosure Bulletin, vol. 16, No. 4, Sep. 1973, "Program Channel Interrupt Chain Scheduling in a Paging Environment".

IBM Technical Disclosure Bulletin, vol. 2, No. 8B, Jan. 1980, "Problem Program Address Space Switching".

IBM Technical Disclosure Bulletin, vol. 25, No.. 8, Jan. 1983, "Sharing of Devices Accessed With the Suspend/Resume Facility".

IBM Technical Disclosure Bulletin, vol. 30, No. 8, Jan. 1988, "Method to Control Client Processes During Remote Pending Operations".

IBM Technical Disclosure Bulletin, vol. 37, No. 8, Aug. 1994, "Enhanced System Manager".

*Primary Examiner*—Kenneth S. Kim
*Attorney, Agent, or Firm*—Andrew J. Dillon

[57] ABSTRACT

A method and system for enhanced system management operations in a superscalar data processing system. Those supervisory level instructions which execute selected privileged operations within protected memory space are first identified as not requiring a full context synchronization. Each time execution of such an instruction is initiated an enable special access (ESA) instruction is executed as an entry point to that instruction or group of instructions. A portion of the machine state register for the data processing system is stored and the machine state register is then modified as follows: a problem bit is set, changing the execution privilege state to "supervisor;" external interrupts are disabled; and access privilege state bit is set; and, a special access mode bit is set, allowing execution of special instructions. The instructions which execute the selected privileged operations within the protected memory space are then executed. A disable special access (DSA) instruction is then executed which restores the bits within the machine state register which were modified during the ESA instruction. The ESA and DSA instructions are implemented without modifying the instruction stream by utilizing user level procedure calls, thereby reducing the overhead of the branch table necessary to determine the desired execution path.

12 Claims, 2 Drawing Sheets

1

METHOD AND SYSTEM FOR ENHANCED MANAGEMENT OPERATION UTILIZING INTERMIXED USER LEVEL AND SUPERVISORY LEVEL INSTRUCTIONS WITH PARTIAL CONCEPT SYNCHRONIZATION

BACKGROUND OF THE INVENTION

1. Technical Field

The present invention relates in general to an improved data processing system and in particular to a method and system for enhanced system management operation in a data processing system. Still more particularly, the present invention relates to a method and system for permitting execution of privileged operations within protected memory space in a data processing system without requiring a full context synchronization.

2. Description of the Related Art

Modern data processing systems utilize various layers of code to provide multiple levels of privilege and protection within the system. At the highest level are user level applications and data which are freely accessed and modified during execution of an application. Next are various protected memory spaces which are utilized to store protected library data and other important data such as authentication routines or the like. Generally a supervisory level of authority is required to access this data. Finally, the operating system layer is the most protected layer within the system. The operating system is responsible for controlling the allocation and usage of hardware resources such as memories, central processing unit time, disk space and peripheral devices. The operating system provides the foundation upon which all other applications are built.

In a superscalar data processing system in which multiple instructions may be dispatched within a single clock cycle, a call to the operating system can be quite time consuming. In the PowerPC architecture jointly created by International Business Machines Corporation and Motorola, the only means for calling the operating system for system management purposes is by means of a System Call (sc) and a return by means of a Return From Interrupt (rfi). Each of these instructions requires a full context synchronization. Depending upon the state of the processor and the various execution units a call to the operating system kernel may take up to twenty clock cycles. The return sequence may be just as time consuming. Additionally, while in a system call routine it is generally necessary to pass through a branch table or similar structure to determine the intended activity of the operating system kernel call.

In view of the above, it should be apparent that it would be advantageous to provide a method and system for system management operations which does not require the utilization of the system call command and its concomitant complexity and delay.

SUMMARY OF THE INVENTION

It is therefore one object of the present invention to provide an improved data processing system.

It is another object of the present invention to provide an improved method and system for enhanced system management operation in a data processing system.

It is yet another object of the present invention to provide an improved method and system for permitting execution of privileged operations within protected memory space in a data processing system without requiring a full context synchronization.

The foregoing objects are achieved as is now described. The method and system of the present invention may be utilized to accomplish enhanced system management operations in a superscalar data processing system. Those supervisory level instructions which execute selected privileged operations within protected memory space are first identified as not requiring a full context synchronization. Each time execution of such an instruction is initiated an enable special access (ESA) instruction is executed as an entry point to that instruction or group of instructions. A portion of the machine state register for the data processing system is stored and the machine state register is then modified as follows: a problem state bit is set, changing the execution privilege state to "supervisor;" external interrupts are disabled; an access privilege state bit is set; and, a special access mode bit is set, allowing execution of special instructions. The instructions which execute the selected privileged operations within the protected memory space are then executed. A disable special access (DSA) instruction is then executed which restores the bits within the machine state register which were modified during the ESA instruction. The ESA and DSA instructions are implemented without modifying the instruction stream by utilizing user level procedure calls, thereby reducing the overhead of the branch table necessary to determine the desired execution path.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
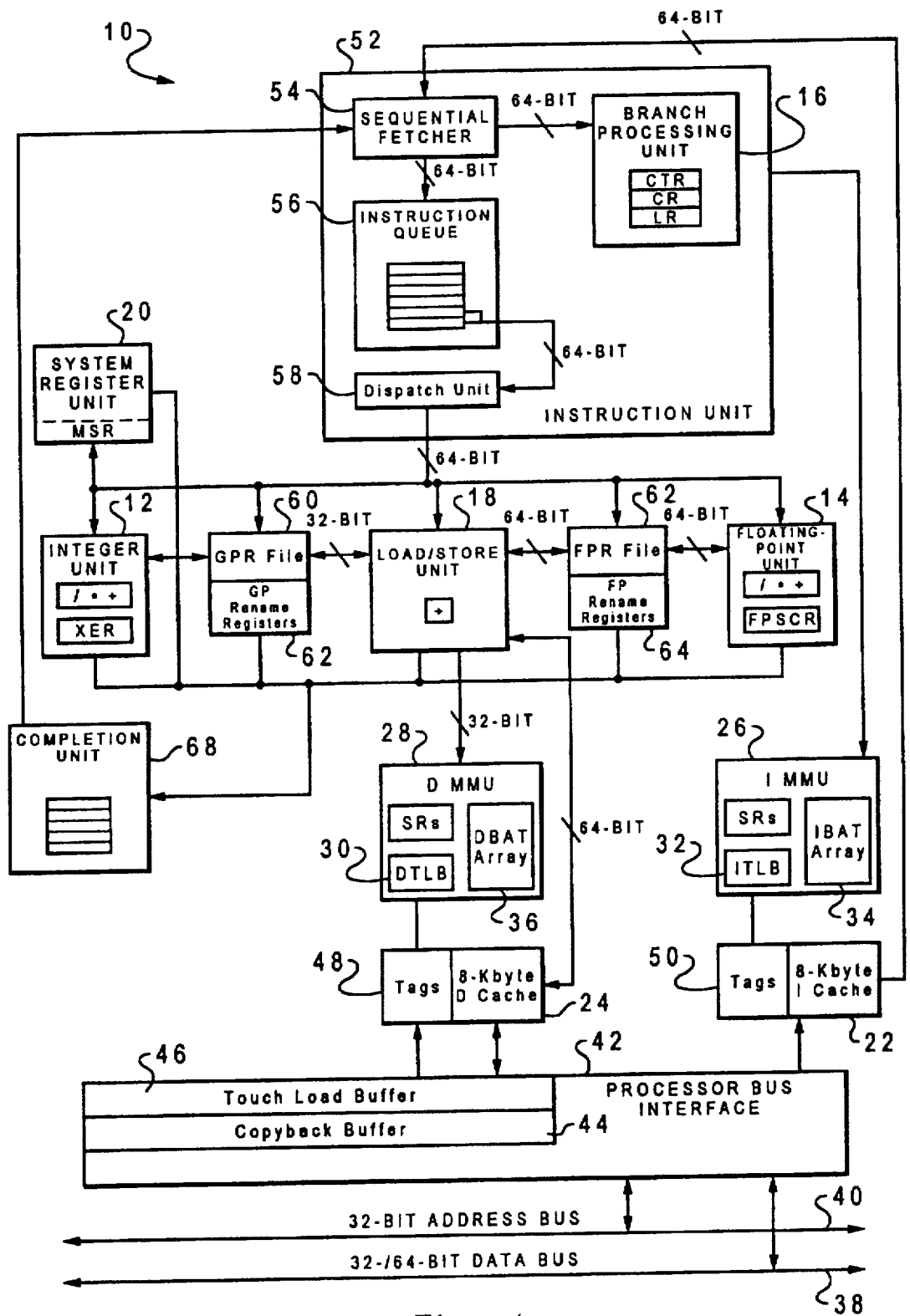
FIG. 1 is a high level block diagram of a data processing system which may be utilized to implement the method and system of the present invention.

FIG. 1 depicts a block diagram of a representative microprocessor 10 upon which the present invention is implemented. Microprocessor 10 may be selected from, for example, the family of PowerPC RISC Processors. This particular microprocessor 10 implements a 32-bit architecture, which provides 32-bit effective addresses and floating point data types of 32 bits. Significantly, the processor can issue and retire as many as two instructions per clock cycle, which instructions may be executed out-of-order for increased performance, but with completion appearing sequential for coherent and systematic operation.

Microprocessor 10 further includes five execution units, integer unit (IU) 12, floating point unit (FPU) 14, branch processing unit (BPU) 16, load-store unit (LSU) 18, and system register unit (SRU) 20 system register unit (SRU) 20 preferably includes a Machine State Register (MSR) which is utilized to store the state of the system for system management purposes. Microprocessor 10 further includes two physically addressed caches, one is an instruction cache 22 and the other is a data cache 24. Both caches are two-way set associative caches. Two memory management units (MMUs) are further included and consist of instruction MMU 26 and data MMU 28. Both MMUs contain 64-entry two-way set associative, data and instruction translation look aside buffers (DTLB and ITLB), 30 and 32, respectively, that provide support for demand-paged virtual memory addressed translation and variable-sized block translation. Microprocessor 10 also supports block address translation through the use of two independent instruction and data block translation (IBAT and DBAT) arrays 34 and 36 of four entries each. Effective addresses are compared simultaneously with all four entries in the BAT array 34 and 36 during block translation.

Microprocessor 10 also includes a selectable 32- or 64-bit data bus 38 and a 32-bit address bus 40. The interface protocol for microprocessor 10 allows multiple masters to compete for system resources through a central external arbiter. Both busses 38 and 40 are connected to processor bus interface 42, which includes a copy-back buffer 44 and a touch load buffer 46. Processor bus interface 42 is further connected to the instruction cache 22, data cache 24, and tags unit 48 and 50, which are connected to data cache 24 and instruction cache 22, respectively. Instruction cache 22 is further connected to instruction unit 52 while data cache 24 is connected to the load/store unit 18. Both instruction and data caches 22 and 24 are further connected to their respective memory management units 30 and 28 via their tags unit 48 and 50. Instruction fetching and issuing is handled in instruction unit 52. Translation of address for cache or external memory accesses is handled by the MMUs 28 and 30.

Instruction unit 52 also includes a sequential fetcher 54, instruction queue 56, dispatch unit 58 and batch processing unit 16, to provide centralized control of instruction flow to the execution units. Instruction unit 52 determines the address of the next instruction to be fetched based on information from the sequential fetcher 54 and from BPU 16.

Instruction unit 52 fetches instructions from instruction cache 22 into queue 56. BPU 16 extracts branch instructions from sequential fetcher 54 and uses static branch prediction on unresolved conditional branches to allow the instruction unit to fetch instructions from a predicted target instruction stream while a conditional branch is evaluated. Instruction queue 56 is designed to hold more than one instruction and can load more than one instruction from instruction unit 52 during a single cycle. Fetcher 54 continuously loads as many instructions as space in the instruction queue allows. Dispatch unit 58 performs source and destination register dependency checking, determines dispatch serializations, and inhibits subsequent instruction dispatching as required.

Branch processing unit 16 receives branch instructions from fetcher 54 performs CR lookahead operations on conditional branches to resolve those branches early, achieving the effect of a zero cycle branch in many cases.

Load/store unit 18 executes all load and store instructions and provides the data transfer interface between general purpose registers (GPRs) 60, floating point registers (FPRs) 62, and the cache/memory subsystem. Load/store unit 18 calculates effective addresses, performs data alignment and provides sequencing for load/store string and multiple instructions. Load and store instructions are issued and translated in program order; however, the actual memory accesses can occur out-of-order. Synchronizing instructions are provided to enforce strict ordering.

Cacheable loads, when free of data dependencies, execute in a speculative manner with a maximum throughput of once per cycle and a two-cycle total latency. Data removed from the cache is held in rename registers 64 and 66 until completion unit 68 commits the value to a GPR or FPR. Stores cannot be executed speculatively and are held in the store queue until completion unit 68 signals that the store operation is to be completed to memory. The time required to perform the actual load or store operation varies depending on whether the operation involves the cache, system memory, or an I/O device.

MMUs 34 and 36 support both virtual memory and physical memory for instruction and data. MMUs 34 and 36 also control access privileges for the spaces on block and page granularities. LSU 18 calculates effective addresses for data loads and stores, performs data alignment to and from cache memory, and provides the sequencing for load and store string and multiple word instructions. The instruction unit 52 calculates the effective addresses for instruction fetching.

After an address is generated, the higher-order bits of the effective address are translated by the appropriate MMU into physical address bits. Simultaneously, the lower-order address bits are directed to the caches where they form the index into the two-way set associative tag array. After translating the address, the MMU passes the higher-order bits of the physical address to the cache, and the cache lookup completes.

Cache units 22 and 24 each have a line size of 32 bits in length and provides a 64-bit interface to instruction fetcher 54 and load/store unit 18, respectively. The surrounding logic or tags 48 and 50, select, organize, and forward the pre-requested information to the requesting unit. Write operation to the cache can be performed on a byte basis, and a complete read-modify-write operation to the cache can occur in each cycle. Both load/store unit 18 and instruction fetcher 54 provide caches 24 and 22 with the address of the data or instruction to be fetched. In the case of a cache hit, the cache returns two words to the requesting unit.

The data cache tags 48 are single ported, and thus simultaneous load or store and snoop accesses can cause resource contention. Snoop accesses have the highest priority and are given first accesses to tags 48, unless the snoop access coincides with a tag write, in which case the snoop is retried and must be rearbitrated for access to the cache. Load or stores that are deferred due to snoop accesses are executed on the clock cycle following the snoop.

Figure 2:
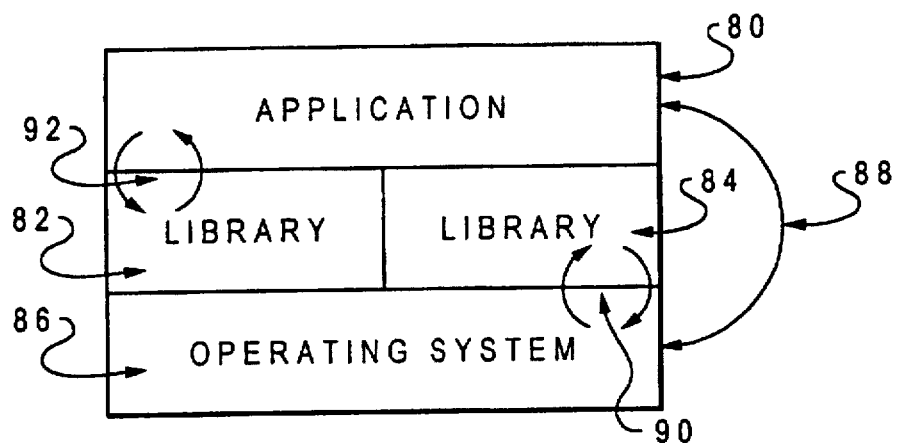
FIG. 2 is a schematic illustration of multiple layers within a data processing system which may be traversed utilizing the method and system of the present invention.

Referring now to FIG. 2, there is depicted a schematic illustration of multiple layers within a data processing system which may be traversed utilizing the method and system of the present invention. As illustrated, the uppermost layer within the system comprises user applications and data, as indicated at reference numeral 80. This is the uppermost level within the system and the least protected code within the system. That is, instructions within application 80 may be executed freely and data therein modified.

Below application layer 80 are certain protected memory spaces such as protected library 82 and protected library 84. Those having ordinary skill in the art will appreciate that other protected data or routines may be present within this layer including, for example, authentication routines. Generally a supervisory privilege level is required in order to modify data or execute instructions within this layer.

Finally, operating system 86 is depicted at the lowest level within the system. Operating system 86 provides the foundation upon which all other applications within the system are built and comprises the controls for determining allocation of assets within the data processing system. Consequently, a supervisory level of privilege is required in order to access data or invoke routines within operating system 86.

Still referring to FIG. 2, it may be seen that a normal call to the operating system for system management purposes within the system requires the invocation of a System Call (sc) which requires full context synchronization. That is, the state of the system must be fully stored and machine serialization accomplished. Context synchronization requires that no higher priority exception exists, the instruction cannot complete until all previous instructions have completed to a point where they can no longer cause an exception, the instructions which precede this instruction will complete in the context under which they were issued, and the instruction following this instruction will execute in the context established by this instruction. Depending upon the state of the processor and execution units, a call to the operating system may take up to twenty clock cycles. As illustrated at reference numeral 88 the call to the operating system and a return from the operating system are quite time consuming. Once within operating system 86 an access to a protected library space, such as library space 84 may be accomplished from the operating system utilizing supervisory privilege levels as indicated at reference numeral 90.

In accordance with an important feature of the present invention, in order to reduce the performance and programming overhead associated with such as system call an enable special access (ESA) instruction has been created which only partially alters the machine state. Utilizing this technique, a system call for access to data within a protected memory space, such as library 82 may be accomplished without invoking the full complexity of an ordinary system call, as graphically depicted at reference numeral 92.

The enable special access instruction is thus executed as an entry point to an instruction or group of instructions which requires supervisory authority to access a protected memory space. In accordance with the present invention, a portion of the machine state register for the data processing system is stored and the machine state register is then modified as follows: a problem state bit is first set, changing the privilege state to "supervisory;" and external interrupts are then disabled; prohibiting the nesting of multiple enable special access instructions; an access privilege state bit is set permitting data within a protected memory space to be accessed and finally, a special access mode bit is set, allowing execution of special instructions and prohibiting the nesting of multiple special access instructions. In this manner, no context synchronization is necessary and the instruction stream and data stream are not altered.

Figure 3:
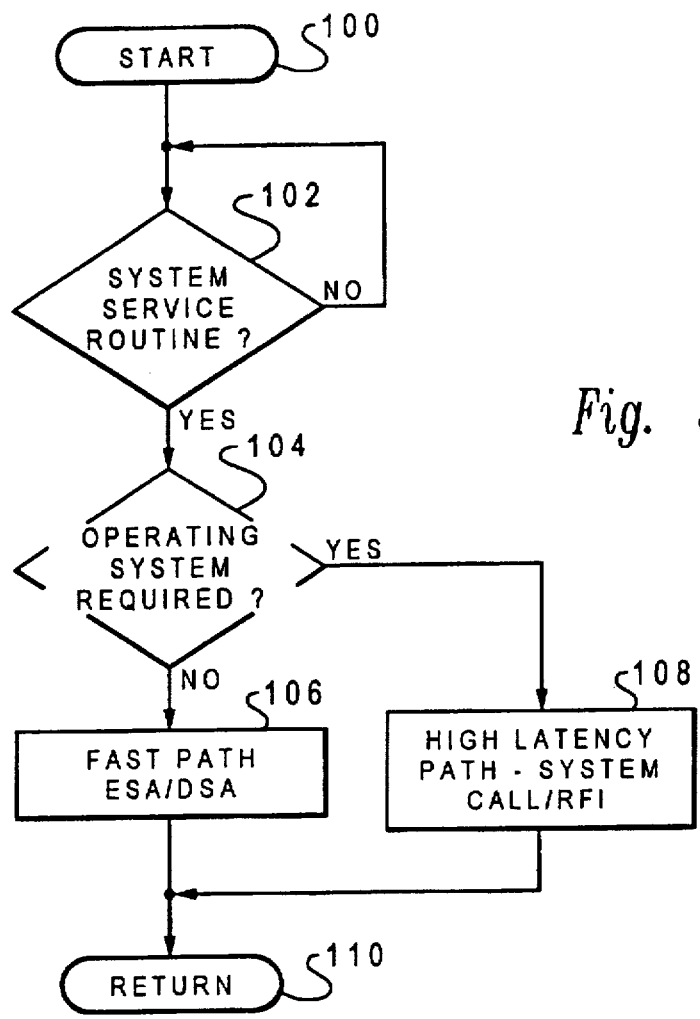
FIG. 3 is a high level logic flowchart illustrating an implementation of the method of the present invention.

With reference now to FIG. 3 there is depicted a high level logic flowchart which illustrates an implementation of the method of the present invention, and which may be implemented utilizing the data processing system of FIG. 1. As depicted, the process begins at block 100 and thereafter passes to block 102. Block 102 illustrates a determination of whether or not a system service routine has been invoked. If not, the process merely iterates to await the invocation of a system service routine.

Still referring to block 102, in the event a system service routine has been invoked, the process passes to block 104. Block 104 illustrates a determination of whether or not an access to the operating system kernel is required. That is, an access in which full context synchronization will be necessary. If not, the process passes to block 106 which illustrates the fast path enhanced system management method of the present invention. As illustrated, this fast path is accomplished utilizing a branch and link call to the enable special access instruction. As described above, a portion of the machine state register is temporarily stored and the content of the machine state register is then slightly altered in order to permit the various privilege states required for this invention. System management code is then invoked and the disable special access instruction is then executed, which results in the restoration of the machine state register. This technique does not require context synchronization to enter the system management functions and the instruction stream is not altered as would be necessary with an ordinary call to the operating system. The invocation of the ESA and DSA instruction instructions and are implemented using user level procedure calls and system management routines are not required to pass through the interrupt vector space, thereby reducing the machine bit traffic.

Referring again to block 104, in the event the operating system is required, the process passes to block 108. Block 108 illustrates the normal high latency path which is implemented utilizing a System Call (sc) which requires the storage of the complete machine state and the passage of the instruction through a branch table or similar structure in order to determine the intended activity of the operating system call. Thereafter, system management code is implemented and a Return From Interrupt (rfi) is the executed, resulting in a complete restoration of the machine state. As described above, this path requires a full context synchronization or machine serialization and thus is quite time consuming.

After either implementing the fast path system management operation or the high latency path the process passes to block 110 which illustrates a return and the awaiting of a subsequent system service routine invocation.

Upon reference to the foregoing those skilled in the art will appreciate that the applicants herein have created a technique whereby system management operation within a data processing system may be enhanced by providing a method and system whereby privileged operations within protected memory space may be accomplished without requiring a full context synchronization and a call to the operating system. As modern data processing system invoke the operating system frequently, the amount of time saved utilizing this technique will result in a substantial enhancement in system efficiency.

While the invention has been particularly shown and described with reference to a preferred embodiment, it will be understood by those skilled in the art that various changes in form and detail may be made therein without departing from the spirit and scope of the invention.

We claim:

1. A method of enhanced system management in a superscalar processor system capable of executing an instruction stream which includes various user level instructions and supervisory level instructions, each of said supervisory level instructions permitting execution of a privileged operation within a routine within said system, said method comprising the steps of:

identifying selected ones of said supervisory level instructions which do not require a full context synchronization;

storing only a partial machine state for said system in response to each attempted execution of an identified supervisory level instruction;

executing said identified supervisory level instruction;

restoring said partial machine state for said system following execution of said identified supervisory level instruction.

2. The method of enhanced system management in a superscalar processor system according to claim 1, wherein said step of identifying selected ones of said supervisory level instructions which do not require a full context synchronization comprises the step of identifying selected ones of said supervisory level instructions which initiate routines which perform an access to a protected memory space within said superscalar processor system.

3. The method of enhanced system management in a superscalar processor system according to claim 1, wherein said step of storing only a partial machine state for said system in response to each attempted execution of an identified supervisory level instruction comprises the step of setting a problem state bit in response to each attempted execution of an identified supervisory level instruction, said problem state bit indicative of a supervisory execution mode of operation.

4. The method of enhanced system management in a superscalar processor system according to claim 3, wherein said step of storing only a partial machine state for said system in response to each attempted execution of an identified supervisory level instruction comprises the step of setting an access privilege bit in response to each attempted execution of an identified supervisory level instruction, said access privilege bit indicative of a supervisory mode of storage access.

5. The method of enhanced system management in a superscalar processor system according to claim 1, wherein said step of storing only a partial machine state for said system in response to each attempted execution of an identified supervisory level instruction comprises the step of setting an external interrupt bit in response to each attempted execution of an identified supervisory level instruction, said external interrupt bit disabling all external interrupts.

6. The method of enhanced system management in a superscalar processor system according to claim 5, wherein said step of restoring said partial machine state for said system following execution of said identified supervisory level instruction comprises the step of resetting said external interrupt bit following execution of said identified supervisory level instruction.

7. A system for enhanced system management in a superscalar processor system capable of executing an instruction stream which includes various user level instructions and supervisory level instructions, each of said supervisory level instructions permitting execution of a privileged operation within a routine within said system, said system comprising:

means for identifying selected ones of said supervisory level instructions which do not require a full context synchronization;

means for storing only a partial machine state for said system in response to each attempted execution of an identified supervisory level instruction;

means for executing said identified supervisory level instruction;

means for restoring said partial machine state for said system following execution of said identified supervisory level instruction.

8. The system for enhanced system management in a superscalar processor system according to claim 7, wherein said means for identifying selected ones of said supervisory level instructions which do not require a full context synchronization comprises means for identifying selected ones of said supervisory level instructions which initiate routines which perform an access to a protected memory space within said superscalar processor system.

9. The system for enhanced system management in a superscalar processor system according to claim 7, wherein the means for storing only a partial machine state for said system in response to each attempted execution of an identified supervisory level instruction comprises means for setting a problem state bit in response to each attempted execution of an identified supervisory level instruction, said problem state bit indicative of a supervisory execution mode of operation.

10. The system for enhanced system management in a superscalar processor system according to claim 9, wherein said means for storing only a partial machine state for said system in response to each attempted execution of an identified supervisory level instruction comprises means for setting an access privilege bit in response to each attempted execution of an identified supervisory level instruction, said access privilege bit indicative of a supervisory mode of storage access.

11. The system for enhanced system management in a superscalar processor system according to claim 10, wherein said means for storing only a partial machine state for said system in response to each attempted execution of an identified supervisory level instruction comprises means for setting an external interrupt bit in response to each attempted execution of an identified supervisory level instruction, said external interrupt bit disabling all external interrupts.

12. The system for enhanced system management in a superscalar processor system according to claim 11, wherein said means for restoring said partial machine state for said system following execution of said identified supervisory level instruction comprises means for resetting said external interrupt bit following execution of said identified supervisory level instruction.

* * * * *